United States Patent Office  3,420,830
Patented Jan. 7, 1969

3,420,830
4-KETO-1,3-BENZODIOXANE AND 4-KETO-1,3-BENZOOXAZINE DERIVATIVES
John H. Fried, Palo Alto, Calif., assignor to Syntex Corporation, Panama, Panama, a corporation of Panama
No Drawing. Filed July 11, 1966, Ser. No. 563,998
U.S. Cl. 260—244     10 Claims
Int. Cl. C07d 87/20; C07d 15/08

ABSTRACT OF THE DISCLOSURE 4-keto-1,3-benzodioxane and 4-keto-1,3-benzooxazine derivatives, prepared from salicylic acid and salicylamide derivatives and acetylenic ethers, are analgesic and anti-inflammatory agents.

---

This invention relates to novel organic compounds. More particularly, this invention pertains to 4-keto-1,3-benzodioxane and 4-keto-1,3-benzooxazine derivatives having the formula:

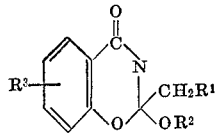

wherein
$R^1$ is hydrogen, lower alkyl or phenyl;
$R^2$ is lower alkyl;
$R^3$ is hydrogen or acetamido;
X is oxa or imino.

By the term lower alkyl is meant a straight or branched chain alkyl group containing from 1 to 6 carbon atoms inclusive. The acetamido substituent may be at the 5, 6, 7 or 8 position, but preferably at the 7 position.

The novel compounds of the present invention are analgesics and anti-inflammatory agents. Hence, they are useful in the treatment of pain and inflammations such as rheumatic diseases. They may be administered in standard pharmaceutical compositions and at dosages appropriate for the particular condition being treated.

The compounds are prepared according to the following reaction scheme:

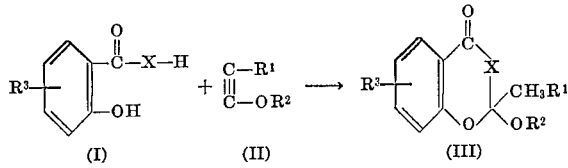

Thus, a compound represented by Formula I is condensed with a compound of Formula II to afford the novel compounds represented by Formula III. In the practice of the process, the reaction is performed in an inert, aprotic, organic solvent such as chloroform, methylene chloride, benzene, dioxane, tetrahydrofuran, or the like, and in the presence of a condensation catalyst. Among the catalysts for the above condensation are acids such as perchloric acid, p-toluenesulfonic acid and the Lewis acids such as sulfuric acid, aluminum chloride, zinc chloride and boron trifluoride etherate, and cupric and mercuric salts such as the acetates, chlorides, bromides and the like. A preferred combination of solvent and catalyst is methylene chloride and mercuric acetate.

The reaction is conducted at a low temperature, i.e. between about −70° C. and 30° C. Preferably, the reagents are mixed at Dry Ice-acetone temperature and allowed to warm to room temperature and held at the latter temperature for a period of about three hours.

The reaction mixture is concentrated to a small volume and the product isolated via conventional techniques, e.g. by distillation under reduced pressure or filtration. Those products represented by Formula III, wherein X is oxa, are usually liquids whereas those products of Formula III, wherein X is imino, are usually solids.

Whereas the following examples are set forth to illustrate the present invention, the scope is not intended to be limited thereby.

EXAMPLE 1

To a solution of 13.8 g. of salicylic acid and 1.6 g. of mercuric acetate in 150 ml. of methylene chloride, previously cooled to about −40° C. in a Dry Ice-acetone bath, is added a solution of 22 g. of ethoxyacetylene in 50 ml. of methylene chloride over a period of 20 minutes. The reaction mixture is allowed to warm to room temperature and then maintained at 25–30° C. for a period of three hours. The mixture is concentrated to a small volume and distilled under reduced pressure to yield 2-methyl-2-ethoxy-4-keto-1,3-benzodioxan, B.P. 250–255° C. at 0.01 mm. Hg.

Utilizing the same procedure, 4-acetamidosalicylic acid and 5-acetamidosalicylic acid are converted to the corresponding 4-keto-1,3-benzodioxan derivatives, namely, 2 - methyl - 2 - ethoxy-4-keto-6-acetamido-1,3-benzodioxan; and 2-methyl - 2 - ethoxy-4-keto-7-acetamido-1,3-benzodioxan, respectively.

EXAMPLE 2

To a solution of 13.8 g. of salicylamide and 1.6 g. of mercuric acetate in 150 ml. of methylene chloride, previously cooled to about −40° C. in a Dry Ice-acetone bath, is added a solution of 22 g. of ethoxyacetylene in 50 ml. of methylene chloride over a period of 20 minutes. The reaction mixture is allowed to warm to room temperature and then maintained at 25–30° C. for a period of three hours. The mixture is washed with water, dried and evaporated to dryness to yield 2-methyl-2-ethoxy-4-keto-1,3-benzooxazine.

Utilizing the same method, 4-acetamido salicylamide and 5-acetamidocylamide are converted to the corresponding 1,3-benzooxazine derivatives, namely, 2-methyl-2-ethoxy-4-keto-6-acetamido-1,3-benzooxazine; and 2-methyl-2-ethoxy-4-keto-7-acetamido - 1,3 - benzooxazine, respectively.

EXAMPLE 3

To a solution of 13 g. of salicyclic acid and 1.6 g. of mercuric acetate in 150 ml. of methylene chloride, previously cooled to about −40° C. in a Dry Ice-acetone bath, is added a solution of 22 g. of 1-methoxy phenylacetylene in 50 ml. of methylene chloride over a period of 20 minutes. The reaction mixture is allowed to warm to room temperature and then maintained at 25–30° C. for a period of three hours. The mixture is concentrated to a small volume and distilled under reduced pressure to yield methyl benzoylene ortho phenylacetate.

By utilizing the above procedure, with one exception, namely substituting ethoxy phenylacetylene, methoxyacetylene, 1-ethoxy-1-propyne, 1-n-propoxy-1-propyne, 1-ethoxy-1-hexyne, 1-n-hexyloxy-1-propyne, 1-ethoxy-1-heptyne, 1-ethoxy-3-methyl-1-butyne, and 1-ethoxy-3,3-dimethyl-1-butyne for 1-methoxy phenylacetylene, there are obtained the corresponding 4-keto-1,3-benzodioxan derivatives, namely, 2-benzyl-2-ethoxy-4-keto-1,3-benzodioxan;
2-methyl-2-methoxy-4-keto-1,3-benzodioxan;
2-ethyl-2-ethoxy-4-keto-1,3-benzodioxan;
2-ethyl-2-n-propoxy-4-keto-1,3-benzodioxan;

2-n-amyl-2-ethoxy-4-keto-1,3-benzodioxan;
2-ethyl-2-n-hexyloxy-4-keto-1,3-benzodioxan;
2-ethoxy-2-n-hexyl-4-keto-1,3-benzodioxan;
2-ethoxy-2-isobutyl-4-keto-1,3-benzodioxan; and
2-ethoxy-2-neopentyl-4-keto-1,3-benzodioxan,
respectively.

EXAMPLE 4

To a solution of 13.8 g. of salicylamide and 1.6 g. of mercuric acetate in 150 ml. of methylene chloride, previously cooled to about −40° C. in a Dry Ice-acetone bath, is added a solution of 22 g. of 1-methoxy phenylacetylene in 50 ml. of methylene chloride over a period of 20 minutes. The reaction mixture is allowed to warm to room temperature and then maintained at 25–30° C. for a period of three hours. The mixture is washed with water, dried and evaporated to dryness to yield 2-methoxy-2-benzyl-4-keto-1,3-benzooxazine.

By utilizing the above procedure, with one exception, namely substituting ethoxy phenylacetylene, methoxyacetylene, 1-ethoxy-1-propyne, 1-n-propoxy-1-propyne, 1-ethoxy-1-hexyne, 1-n-hexyloxy-1-propyne, 1-ethoxy-1-heptyne, 1-ethoxy-3-methyl-1-butyne, and 1-ethoxy-3,3-dimethyl-1-butyne for 1-methoxy phenylacetylene, there are obtained the corresponding 1,3-benzooxazine derivatives, namely, 2-ethoxy-2-benzyl-4-keto-1,3-benzooxazine;
2-methoxy-2-methyl-4-keto-1,3-benzooxazine;
2-ethoxy-2-ethyl-4-keto-1,3-benzooxazine;
2-n-propoxy-2-ethyl-4-keto-1,3-benzooxazine;
2-ethoxy-2-n-amyl-4-keto-1,3-benzooxazine;
2-n-hexyloxy-2-ethyl-4-keto-1,3-benzooxazine;
2-ethoxy-2-n-hexyl-4-keto-1,3-benzooxazine;
2-ethoxy-2-isobutyl-4-keto-1,3-benzooxazine; and
2-ethoxy-2-neopentyl-4-keto-1,3-benzooxazine,
respectively.

What is claimed is:
1. A compound having the formula

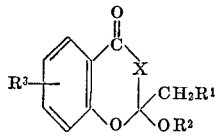

wherein $R^1$ is hydrogen, lower alkyl or phenyl;
$R^2$ is lower alkyl;
$R^3$ is hydrogen or acetamido; and
X is oxa or imino; with the proviso that $R^1$ is phenyl when $R^3$ is hydrogen and X is imino.

2. A compound according to claim 1 wherein $R^3$ is hydrogen and X is oxa.
3. A compound according to claim 2 wherein $R^1$ is hydrogen; $R^2$ is ethyl.
4. A compound according to claim 2 wherein $R^1$ is methyl and $R^2$ is ethyl.
5. A compound according to claim 2 wherein $R^1$ is phenyl and $R^2$ is ethyl.
6. A compound according to claim 1 wherein $R^3$ is hydrogen and X is imino.
7. A compound according to claim 6 wherein $R^1$ is phenyl and $R^2$ is ethyl.
8. A compound according to claim 1 wherein $R^1$ is hydrogen; $R^2$ is ethyl; $R^3$ is 6-acetamido and X is oxa.
9. A process for the preparation of a compound according to claim 1 which comprises treating a starting material of the formula:

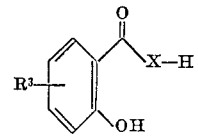

wherein $R^3$ and X are as defined therein, with an acetylenic ether of the formula $R^1C{\equiv}COR^2$, wherein $R^1$ and $R^2$ are as therein defined, in the presence of a condensation catalyst.

10. The process of claim 9 wherein the condensation catalyst is mercuric acetate.

References Cited

UNITED STATES PATENTS 2,510,036  5/1950  Mowry _____ 260—340.2
2,943,087  6/1960  Ohnacker et al. _____ 260—244

OTHER REFERENCES

Irie et al.: Chem. Abst. vol. 54, column 5657 (1960) QDI.A51.

Runti et al.: Chem. Abst. vol. 54, columns 22601–2 (1960). QDI.A51.

HENRY R. JILES, *Primary Examiner.*

NATALIE TROUSOF, *Assistant Examiner.*

U.S. Cl. X.R.

260—340.2, 519, 521, 559, 611, 614, 999